May 23, 1967 H. K. LOTZ 3,321,067
DEVICE FOR THE REMOVAL OF CUT-OFF WORK PIECES IN CONTINUOUS CASTING INSTALLATIONS
Filed Nov. 8, 1966
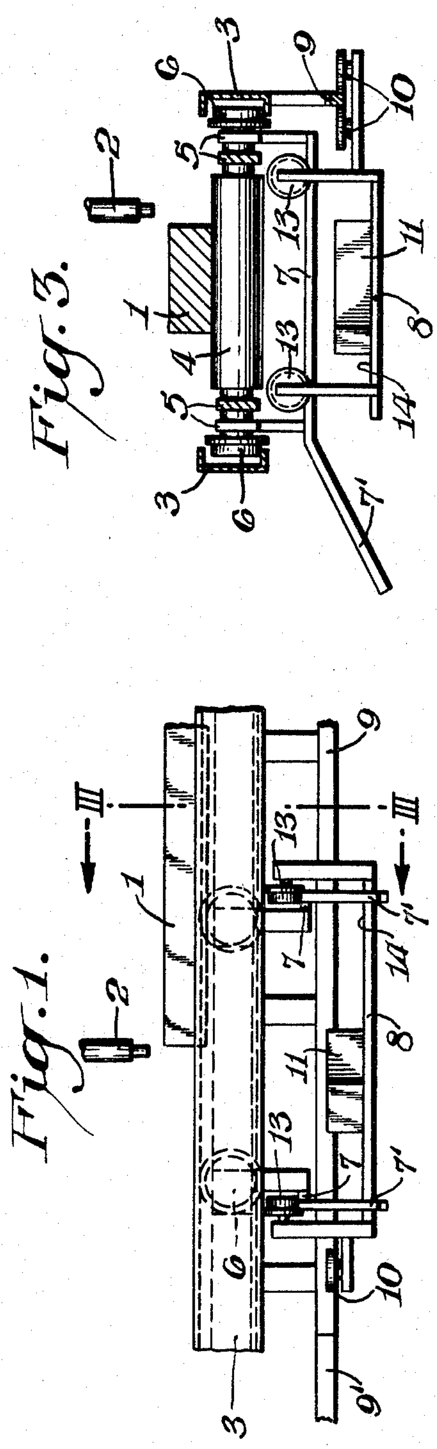
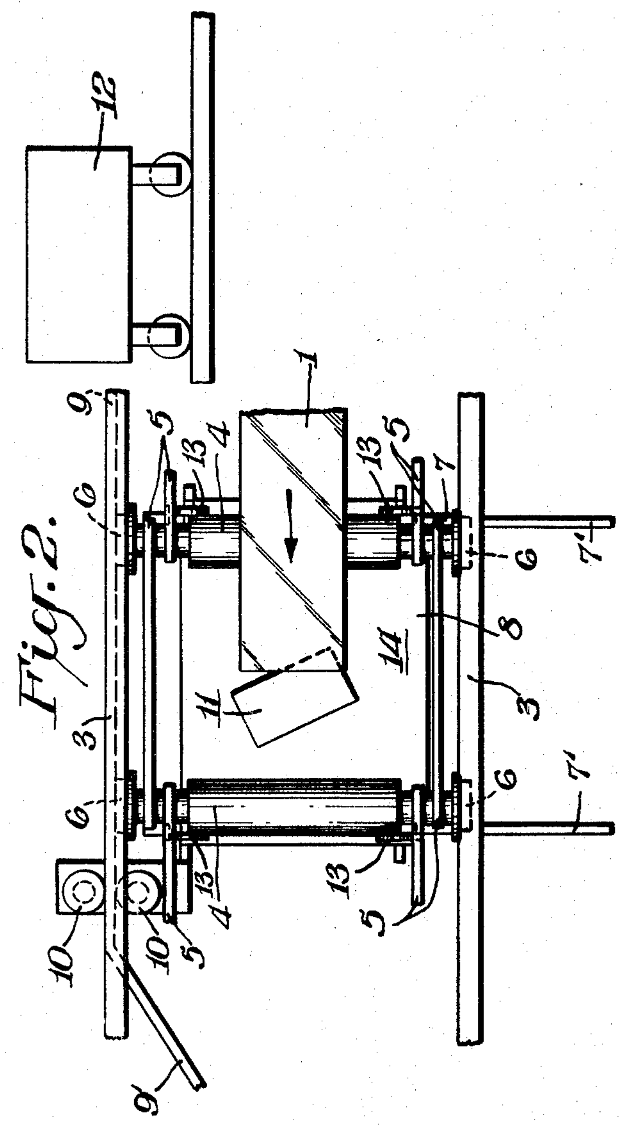

United States Patent Office 3,321,067 Patented May 23, 1967

1

2

3,321,067

DEVICE FOR THE REMOVAL OF CUT-OFF WORK PIECES IN CONTINUOUS CASTING INSTALLATIONS

Horst K. Lotz, Hanauer Landstrasse 505A, Frankfurt am Main, Germany

Filed Nov. 8, 1966, Ser. No. 592,790
Claims priority, application Germany, Aug. 19, 1964, M 62,147
4 Claims. (Cl. 198—78)

This application is a continuation-in-part of copending application 480,409 filed Aug. 17, 1965, now abandoned.

This invention relates to a device for the removal of work piece segments (billets, ingots or cast slabs) cut off in the continuous casting installation.

In continuous casting installations the cast work piece is moved with the cutting torch moving above it whereby after a certain amount of forward travel a segment of the work piece is cut off by the torch. The torch then returns to its original position to begin another cutting operation. The cut segments are caught by a take-up table disposed under the moving work piece and are then discharged to a transfer cart. These take-up tables for the cut pieces are arranged below the cutting device and are movable synchronously with the cutting device. In cases where after the casting, the work pieces are conducted only at a horizontal level, there is no difficulty involved in unloading the segments onto the take-up table and then from the table upon a transfer cart or the like. If work pieces in various levels, however, are conveyed one over the other through the cutting route, (which has recently often been the case) the slight vertical distance between the work pieces does not permit the dropping of the cut-off work pieces or segments caught by a pick-up cart.

An object of this invention is to provide a segment removal arrangement which could be effectively used even when the work pieces are disposed at various levels.

By the proposal of this invention, even in continuous casting installations with a plurality of work pieces guided one over the other, it is possible to achieve a friction-less removal. For this purpose, the arrangement is constructed in such a manner that the take-up table is provided with a device which at the end of the process run produces a relative movement of the cut-off piece to the supporting area of the table in a manner that the table is removed lateral to the direction of travel. According to a preferred form of construction, the device for producing the relative movement between the piece and the supporting area consists of a guiding rail, bent sideways just before its terminus and limiting the relative movement of the take-up table, this sideways bends effects on the take-up table, which is movable on the track beams, a movement lateral to the travel direction of the work piece. In order to facilitate the tipping down of the work pieces, track beams are formed in a tilted shape outside the range of the track support arrangement.

Further particulars and advantages of the invention can be derived from the following description of the example of construction represented in the drawing wherein:

FIG. 1 is a side view of one arrangement of the invention;

FIG. 2 is a top view of the arrangement shown in FIG. 1; and

FIG. 3 is a cross-section taken through FIG. 1 along the lines III—III.

As shown in FIG. 1 continuous work piece 1 is moved along the track rail of the support arrangement 3 below cutting torch 2. Support arrangement 3 is associated with support rolls 4 and side bar 5 for holding the track rails 7 for the take-up table 8. Roller track wheels 6 are supported in support rail 3 as shown in FIG. 1 with the take-up table guide rail 9 being mounted below rail 3. Rollers 10 connected to table 8 roll along rail 9 to guide the movement of table 8. Take-up table 8 includes a support area 14 which receives the cut-out work piece or segment 11. This work piece 11 is later deposited into transfer cart 12.

The receiving arrangement consists of a flat take-up table 8 suspended by means of rollers 13 on track rails 7. Rails 7 are carried by rollers 4 and move along with them, thereby moving suspended table 8. A laterally mounted rail 9 for the guiding of this table 8 forces table 8 to remain, with the exception of the unloading point, on the straight part of the track rail below the work piece to be cut. Rail 9 thus also determines the position of table 8 on rails 7. At the unloading point the bend 9′ of rail 9 causes the table to move laterally, receiving because of the inclined shape of ends 7′ of the track beam 7 an inclination sufficient for the sliding off of the cut-off pieces, so that the cut-off work piece can slide into the transfer cart or the like.

As to continuous work piece tracks arranged one over the other, under certain provisions an individual transfer cart 12 can be used for the removal of the work pieces dropped by the unloading arrangements situated one over the other.

The lifting of the take-up table 8 from the inclined position to a level one takes place positively, i.e. without special additional measures, by the retraction of the unloading arrangement to its starting position by the rollers 10 adjoining the guide rail 9 on both sides.

The invention can be embodied in the most diversified manner and is not limited to the form of construction shown. Thus, the lateral removal of the cut-off parts can be accomplished by means of a small puller in transverse direction or by means of a pneumatically activated slide bar which is moved along on the surface of the take-up table. It should also be easily possible to tip the supporting table toward a slide arranged at the end of the process run.

What is claimed is:

1. A device for the removal of work piece segments cut off in continuous casting installations having means for transporting and cutting the cast work piece, said device comprising a take-up table for receiving the segments, means for moving said table along a predetermined path under the work piece, first guiding means fixedly mounted with respect to said moving means for said take-up table, second guiding means attached to said take-up table, said second guiding means guiding said take-up table along said first guiding means, and said first guiding means effecting a lateral movement of said take-up table relative to the movement of the work piece before the end of said predetermined path and also limiting said lateral movement.

2. A device according to claim 1 wherein said first guiding means for creating the lateral movement of said take-up table consists of guiding rail bent sideways just before said end of said path, and said second guiding means including guiding rolls engaging said guiding rail.

3. A device according to claim 2 wherein said means for moving said table is connected to said table by a movable track beam disposed substantially perpendicular to said guiding rail, and rollers being attached to said table and mounted on said track beam.

4. A device according to claim 3 wherein the end of said track beam is bent downward outside the range of the work piece movement to effect a tilting movement to said table.

No references cited.

EVON C. BLUNK, *Primary Examiner.*

A. C. HODGSON, *Assistant Examiner.*

UNITED STATES PATENT OFFICE

CERTIFICATE OF CORRECTION

Patent No. 3,321,067 May 23, 1967

Horst K. Lotz

It is hereby certified that error appears in the above numbered patent requiring correction and that the said Letters Patent should read as corrected below.

Column 1, line 11, for "continuation-in-part" read -- continuation --.

Signed and sealed this 19th day of November 1968.

(SEAL)
Attest:

Edward M. Fletcher, Jr.
Attesting Officer

EDWARD J. BRENNER
Commissioner of Patents